(12) United States Patent
Schröter (10) Patent No.: US 12,195,018 B2
(45) Date of Patent: Jan. 14, 2025

(54) WIRE BASED CONTROL SYSTEM FOR CONTROLLING A MOTOR VEHICLE

(71) Applicant: Dr. Ing. h.c. F. Porsche Aktiengesellschaft, Stuttgart (DE)

(72) Inventor: Philipp Schröter, Chemnitz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 298 days.

(21) Appl. No.: 17/723,567

(22) Filed: Apr. 19, 2022

(65) Prior Publication Data

US 2022/0355810 A1 Nov. 10, 2022

(30) Foreign Application Priority Data

May 10, 2021 (DE) .................. 10 2021 112 146.9

(51) Int. Cl.
*B60W 50/038* (2012.01)
*B60R 16/023* (2006.01)
*H04L 9/40* (2022.01)
*H04Q 11/00* (2006.01)

(52) U.S. Cl.
CPC ....... *B60W 50/038* (2013.01); *B60R 16/0231* (2013.01); *H04L 63/0428* (2013.01); *H04Q 11/0005* (2013.01); *B60W 2510/20* (2013.01); *B60W 2720/10* (2013.01); *H04Q 2213/13178* (2013.01)

(58) Field of Classification Search
CPC .......... B60W 50/038; B60W 2510/18; B60W 2510/20; B60W 2710/18; B60W 2720/10; H04L 63/0428; H04L 63/123; H04L 67/12; H04L 67/125; H04Q 11/0005; H04Q 2209/30; H04Q 2213/13106; H04Q 2213/13178; B60R 16/0207; B60R 16/023; B60R 16/0231; B60R 16/0238; G06F 3/00; G08C 19/30; G08C 23/06; G08C 25/00
See application file for complete search history.

(56) References Cited

U.S. PATENT DOCUMENTS

| | | | |
|---|---|---|---|
| 10,377,371 B2* | 8/2019 | Anderson | B60W 10/20 |
| 10,464,599 B2 | 11/2019 | Dreyer | |
| 2001/0032042 A1* | 10/2001 | Disser | B60T 8/885 |
| | | | 701/31.4 |
| 2003/0120401 A1* | 6/2003 | Bauer | B60G 17/0195 |
| | | | 701/41 |
| 2016/0236653 A1* | 8/2016 | Katou | H04W 12/041 |

(Continued)

FOREIGN PATENT DOCUMENTS

| | | | | |
|---|---|---|---|---|
| DE | 10112514 A1 * | 6/2002 | | B60G 17/0195 |
| EP | 3372453 A2 | 9/2018 | | |

OTHER PUBLICATIONS

English translation of DE 10112514 (Year: 2002).*

*Primary Examiner* — Russell Frejd
*Assistant Examiner* — Brandon Z Willis
(74) *Attorney, Agent, or Firm* — Buchanan Ingersoll & Rooney PC (57) ABSTRACT

A wire based control system for controlling a motor vehicle has an input having a transmitting unit for emitting signals for executing input commands, a first transmission channel for transmitting a first signal, a second transmission channel for transmitting a second signal, a receiving unit for receiving the signals, and an execution for executing the input commands.

20 Claims, 7 Drawing Sheets

(56) References Cited

U.S. PATENT DOCUMENTS

| | | | | |
|---|---|---|---|---|
| 2018/0170157 A1* | 6/2018 | Iott | ........................ | B60J 7/0573 |
| 2018/0222409 A1* | 8/2018 | Binder | .................. | B60R 16/023 |
| 2019/0155231 A1* | 5/2019 | Weng | ..................... | G06Q 50/06 |
| 2020/0156624 A1* | 5/2020 | Witte | .................... | B60W 30/02 |
| 2022/0344117 A1* | 10/2022 | Lee | ........................ | H01H 47/00 |

* cited by examiner

WIRE BASED CONTROL SYSTEM FOR CONTROLLING A MOTOR VEHICLE

CROSS-REFERENCE TO RELATED APPLICATION

This application claims priority to German Patent Application No. 10 2021 112 146.9, filed May 10, 2021, the content of such application being incorporated by reference herein in its entirety.

FIELD OF THE INVENTION

The present invention relates to a cable (i.e., wire) based control system for controlling a motor vehicle, to a motor vehicle comprising such a system, and to a cable-based control method for controlling a motor vehicle.

SUMMARY OF THE INVENTION

Wire or cable based control systems such as X-by-Wire systems are nowadays known, for example, in the form of Steer-by-Wire and Brake-by-Wire systems from aircraft. The systems known from aircraft generally have a plurality of communication lines which connect a sensor (for example the control stick) to an actuator (for example the actuating element for the air flaps), wherein the failure of or false information from individual lines is compensated for by means of a majority decision.

In contrast to aircraft, motor vehicles are nowadays generally still controlled via a mechanical connection between the steering wheel and wheels and between the brake pedal and brake. Although approaches to integrating the system known from aircraft in motor vehicles are also occasionally known, this does not appear to be appropriate, in particular for reasons of costs and for reasons of the manufacturing complexity. In contrast to aircraft, motor vehicles can stop safely. In addition, the number of expected errors in motor vehicles is considerably lower. This makes the expensive and complicated known systems from aircraft unsuitable for adaptation in systems for motor vehicles.

Described herein is a structurally simple, cost-effective and appropriately safe cable-based control system for controlling a motor vehicle.

Features and details described in connection with the system according to aspects of the invention also apply in connection with the method according to aspects of the invention and vice versa in each case, with the result that reference always is or can be made reciprocally with respect to the disclosure concerning the individual aspects of the invention.

The invention provides a wire or cable-based control system for controlling a motor vehicle. In this case, the control system has an input means having a transmitting unit for emitting signals for executing input commands, a first transmission channel for transmitting a first signal and a second transmission channel for transmitting a second signal. The control system also comprises a receiving unit of an execution means for receiving the signals as well as an execution means for executing the input commands.

According to aspects of the invention, the control system is therefore designed to appropriately compensate for the expected errors and dangers, which result from individual items of false information on communication lines of the system, with respect to the probability of their occurrence. This therefore provides not only a safe but also a cost-effective and structurally uncomplicated system for controlling a motor vehicle. The method of operation of the control system according to aspects of the invention, in particular the interaction of the individual components, is explained in more detail below.

The introduction of various redundancies when communicating inside a control system for controlling a motor vehicle makes it possible, in particular, despite low costs and low structural complexity, to ensure sufficient reliability for compensating for communication errors which occasionally occur.

Within the scope of the invention, the term "cable-based control system or cable-based control method" can be understood as meaning, in particular, "X-by-Wire systems or methods" such as Steer-by-Wire, Brake-by-Wire or Drive-by-Wire systems or methods. Within the scope of the invention, an input means can also be understood as meaning, for example, steering command input means, such as a steering wheel, or brake command input means, such as a brake pedal, or the like. According to aspects of the invention, an input command can also be understood as meaning a steering command or a brake command or the like. Within the scope of the invention, execution means can finally be understood as meaning, in particular, steering means, such as a steering actuator, or a brake means, such as a brake. Within the scope of the invention, a transmitting unit can be understood as meaning, in particular, a unit from which information, data or signals is/are specifically sent via the transmission channels. Within the scope of the invention, a receiving unit can be understood as meaning, in particular, a unit which receives the information, data or signals sent by the transmitting unit.

Within the scope of the present invention, it may entail advantages if the first transmission channel is bidirectional, wherein the first transmission channel is preferably in the form of the electrical vehicle network. This makes it possible to integrate reliable data transmission in a particularly simple and cost-effective manner. In this case, the first transmission channel may preferably be in the form of a return channel or redundancy channel in order to effectively detect errors when transmitting input commands such as steering or brake commands. In this case, feedback for the driver relating to the road conditions, for example relating to the steering resistance or the roughness of a road, can be transmitted, in particular, in addition to an input command, via the first transmission channel.

It may also entail advantages if a central control unit is provided for the purpose of receiving and forwarding signals, wherein the central control unit is preferably integrated in the first transmission channel, in particular is arranged between the input means and the execution means.

In this case, the invention may provide, in particular, for communication to take place via the central control unit within the first transmission channel. For example, an input command such as a steering and/or brake command can be transmitted from the transmitting unit of an input means, such as a steering wheel and/or a brake pedal, via the central control unit to the receiving unit of an execution means, such as a steering actuator or a brake. Such an embodiment provides, in particular, easily programmable, centrally controllable communication.

Within the scope of reliable and, at the same time, simple and cost-effective data transmission, it also entails advantages if the second transmission channel is unidirectional, wherein the second transmission channel is preferably in the form of an optical transmission channel, in particular in the form of a fiber-optic cable or a polymer optic fiber (POF). In this case, fiber-optic cables provide the advantage that they cannot be externally disrupted by electromagnetic interference. In this case, the second transmission channel may be formed from multimode fibers and can be operated using favorable LEDs instead of lasers. A unidirectional design of the communication channel makes it possible, in particular, to generate a simple and cost-effective design. Within the scope of this unidirectional design, communication is possible only from a transmitting unit of an input means, such as a steering wheel and/or a brake, to a receiving unit of an execution means, such as a steering actuator and/or a brake. In this case, the transmission of the signal via the second transmission channel can preferably be carried out from the transmitting unit of the input means directly to the receiving unit of the execution means. Such a design of a second, redundant transmission channel makes it possible, for example, to reduce the outlay and costs for additional light-emitting diodes or the like on the execution means side and to save on additional photodiodes on the input means side. Furthermore, such a design of a second, redundant transmission channel makes it possible to avoid the outlay and costs of the is optical components for separating the optical signals of the forward and return paths or for a second fiber for the return path and to simultaneously avoid errors in the case of system defects (for example during time division multiplex operation). Within the scope of an advantageous embodiment, the input means, such as a steering wheel or a brake pedal, may also have point-to-point connections or point-to-multipoint connections to the execution means, such as the brake (preferably all brakes) and the steering systems (the steering actuators).

It entails further advantages if the transmitting unit of the input means has a first and a second switching unit, wherein the first switching unit is preferably in the form of a microcontroller and the second switching unit is, in particular, in the form of an application-specific integrated circuit. Within the scope of the invention, a switching unit may be understood as meaning, in particular, a chip or the like. A design of the second switching unit as an application-specific integrated circuit (ASIC) whose basic functionality cannot be changed may be used in this case, in particular, to protect against software errors/malware. The microcontroller may also be, in particular, in the form of a microcontroller or the like which parameterizes the ASIC and may parameterize the ASIC in a safe range of values in order to implement steering locks of different severity or non-linear angle steering lock functions.

With regard to generating reliable transmission of input commands, such as steering and brake commands, in a simple and cost-effective manner, it is likewise conceivable for the first switching unit to be integrated in the first transmission channel and for the second switching unit to be integrated in the second transmission channel. In this case, provision may be made, in particular, for the first switching unit which is preferably in the form of a microcontroller to send the input commands via the first transmission channel which is preferably in the form of an electrical vehicle network, in particular via the central control unit. In contrast, the second switching unit which is preferably in the form of an ASIC can send the input commands via the second transmission channel which is preferably in the form of a fiber-optic connection, with the result that it is still possible to transmit the commands if one of the two transmission channels, for example on one of the two switching units, fails.

Further advantages can be achieved if the receiving unit of the input means has a first and is a second switching unit, wherein the first switching unit is preferably in the form of a microcontroller and the second switching unit is, in particular, in the form of an application-specific integrated circuit. Such an arrangement makes it possible to transmit input commands in a particularly secure and reliable manner. Inside the receiving unit, the first and second switching units may preferably also be monolithic. This ensures, in particular, that the control system to which the subject matter relates can be produced in a simple manner and arranged in a compact manner. Within the scope of a monolithic design of the receiving unit, the redundancy provided for executing a braking operation and/or steering operation can then preferably be established in another manner. Inside the receiving unit, provision may also be preferably made according to the subject matter for the first switching unit to be integrated in the first transmission channel and for the second switching unit to be integrated in the second transmission channel. The first switching unit of the receiving unit that is preferably in the form of a microcontroller may also be advantageously designed to transmit feedback, such as steering and/or braking feedback, to the input means via the first transmission channel. The switching units of the receiving unit of the execution means in the form of a steering means (steering actuator) may be designed in this case in a structurally identical manner to the switching units of the receiving unit of the execution means in the form of a brake means (brake), save for the fact that a separate receiving unit may preferably be provided for each brake means.

The invention likewise also relates to a motor vehicle comprising a system described above. The motor vehicle according to aspects of the invention therefore has the same advantages as have already been described in detail with respect to the system according to aspects of the invention.

The invention likewise also relates to a cable-based control method for controlling a motor vehicle, in particular for controlling a control system described above. In this case, the method according to aspects of the invention comprises the steps of using a transmitting unit of an input means to emit signals for executing an input command, transmitting a first signal via a first transmission channel and transmitting a second signal via a second transmission channel. The method also comprises the steps of a receiving unit of an execution means receiving the signals, and using the execution means to execute the input command. The motor vehicle according to aspects of the invention therefore has the same advantages as have already been described in detail with respect to the control system according to aspects of the invention.

It may entail advantages if the transmitting unit of the input means receives an input command via sensors, wherein a first and a second sensor are provided for the purpose of receiving an input command, wherein the input command is transmitted both to the first and to the second switching unit by the first and second sensors. Simultaneously transmitting an input command from a first and a second sensor to both a first and a second switching unit provides further redundancy for increasing the failure safety of a control system to which the subject matter relates. If the rotational angle is measured with the aid of two different sensors, for example on a steering command input means, the redundancy which is made possible by integrating a second transmission channel can be advantageously carried on by virtue of the fact that both sensors transmit their data both to the first and to the second switching unit. It is thus possible for the steering data to be able to be transmitted further in the event of failure of a switching unit or a transmission channel.

It entails further advantages if the signals are transmitted in an encrypted manner, wherein the second transmission channel is preferably encrypted by means of a vehicle-specific key, wherein a message authentication code which is calculated or derived from the input commands or data and the vehicle-specific key is created, in particular, during encryption. Encrypted signal transmission enables, in particular, more secure communication inside a vehicle. This makes it possible to determine bit errors and malicious changes of the data on the transmission path. In addition, provision may also be made for the data packets on the second transmission channel to be protected with forward error correction in order to be able to detect and correct bit errors caused by loose connectors at an early stage. For reasons of safety, provision may also be advantageously made for the vehicle to change to a safe state, for example an emergency stop, in the event of necessary correction. The input commands, such as steering and/or brake commands, or data, such as steering and/or brake data, may preferably be sent in a completely parallel manner via the first and second transmission channels so that fast changeover can be enabled if a connection fails. In this case, the transmission interval of the input commands or data may be less than 10 ms, preferably less than 5 ms, in particular 1 ms.

In order to ensure not only reliable transmission of a steering command but also reliable execution of the steering command when carrying out a steering operation, the invention may provide, in particular, for the function of the execution means to be substituted using at least one other execution means in the event of a defect, wherein a steering operation with a defective steering means is preferably carried out by activating at least one brake means. This makes it possible to carry out steering despite a defective steering actuator by braking individual wheels. In an emergency, a vehicle can therefore be steered using a torque vectoring/ESP-like system. For reasons of safety, the vehicle should change to a safe state, for example an emergency stop, as quickly as possible when using this steering method.

Further advantages, features and details of the invention emerge from the following description which describes exemplary embodiments of the invention in detail with reference to the drawings. In this case, the features mentioned in the claims and in the description may each be essential to the invention individually per se or in any desired combination.

DETAILED DESCRIPTION OF THE INVENTION

Figure 1:
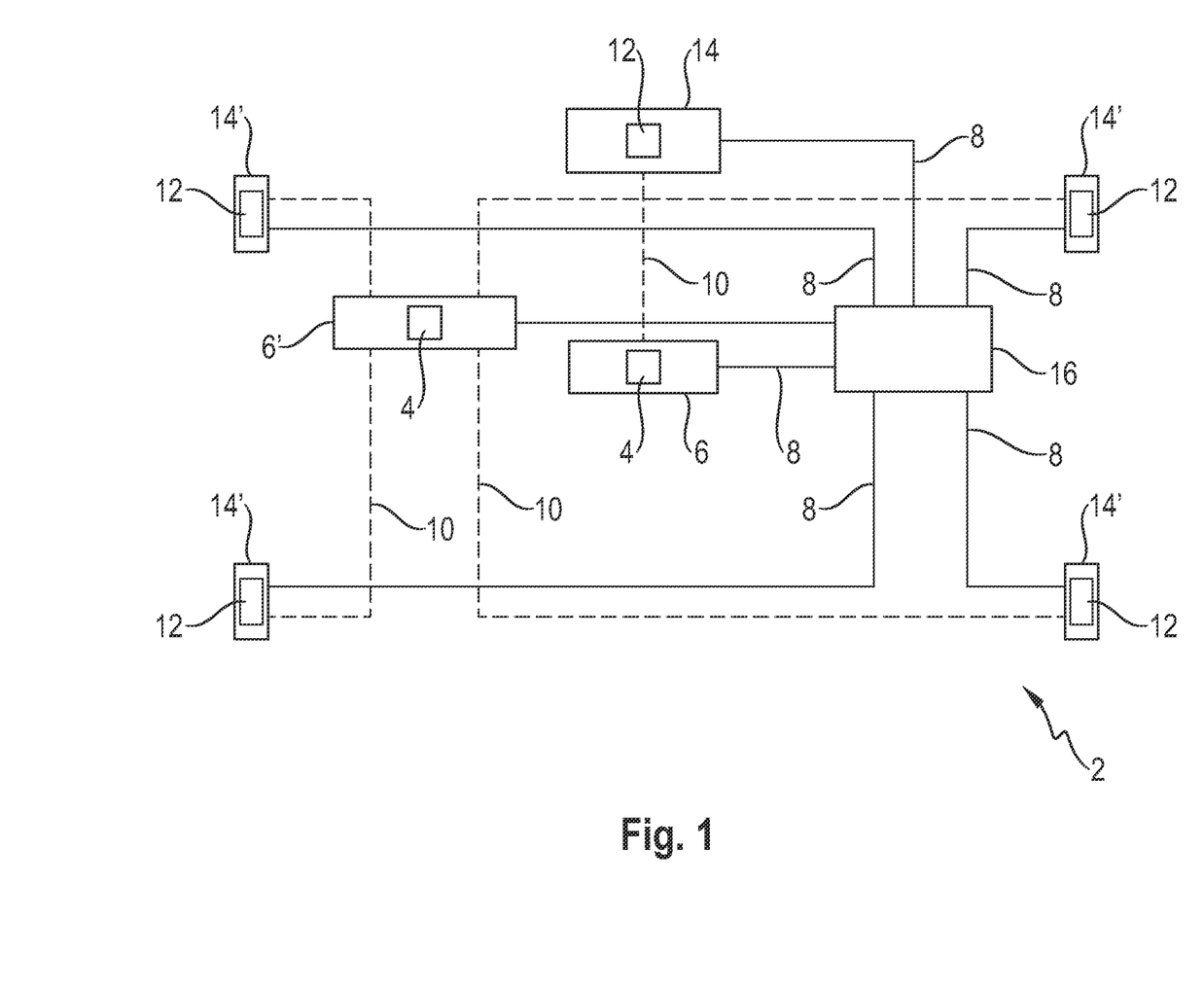
FIG. 1 schematically shows an embodiment of a control system according to aspects of the invention for controlling a motor vehicle, FIG. 2a schematically shows a transmitting unit of an input means of the control system according to aspects of the invention according to a first exemplary embodiment, FIG. 2b schematically shows a receiving unit of an execution means of the control system according to aspects of the invention according to a first exemplary embodiment, FIG. 3 schematically shows a data packet for transmitting an input command of the control system according to aspects of the invention according to a first exemplary embodiment, FIG. 4a schematically shows a control method for compensating for the failure of a steering actuator in a control system according to aspects of the invention according to a first exemplary embodiment, FIG. 4b schematically shows a control method for compensating for the failure of a steering actuator in a control system according to aspects of the invention according to a second exemplary embodiment, FIG. 5 schematically shows an embodiment of a control method according to aspects of the invention for controlling a motor vehicle.

FIG. 1 shows an embodiment of a cable-based control system 2 according to aspects of the invention for controlling a motor vehicle.

In this case, the control system 2 comprises an input means 6, 6' having a transmitting unit 4 for emitting signals for executing input commands, a first transmission channel 8 for transmitting a first signal, a second transmission channel 10 for transmitting a second signal, a receiving unit 12 of an execution means 14, 14' for receiving the signals, and an execution means 14, 14' for executing the input commands.

In the present case, a Steer-by-Wire and/or Brake-by-Wire system is illustrated as an example of a cable-based control system, with the result that in the present case the input means are in the form of steering command input means, in particular a steering wheel, and/or brake command input means, in particular a brake pedal. In the present case, an input command is accordingly understood as meaning a steering command and/or a brake command. In the present case, the execution means are in the form of a steering means, such as a steering actuator, or a brake means, such as a brake.

As can be seen in FIG. 1, the first transmission channel 8 is bidirectional in the present case and is in the form of the electrical vehicle network.

In this case, a central control unit 16 is provided for the purpose of receiving and forwarding signals, which central control unit is integrated in the first transmission channel 8 in the present case and is arranged between the input means 6, 6' and the execution means 14, 14'.

In contrast, the second transmission channel 10 is unidirectional and is in the form of an optical transmission channel, in particular in the form of a fiber-optic cable.

Figure 2A:
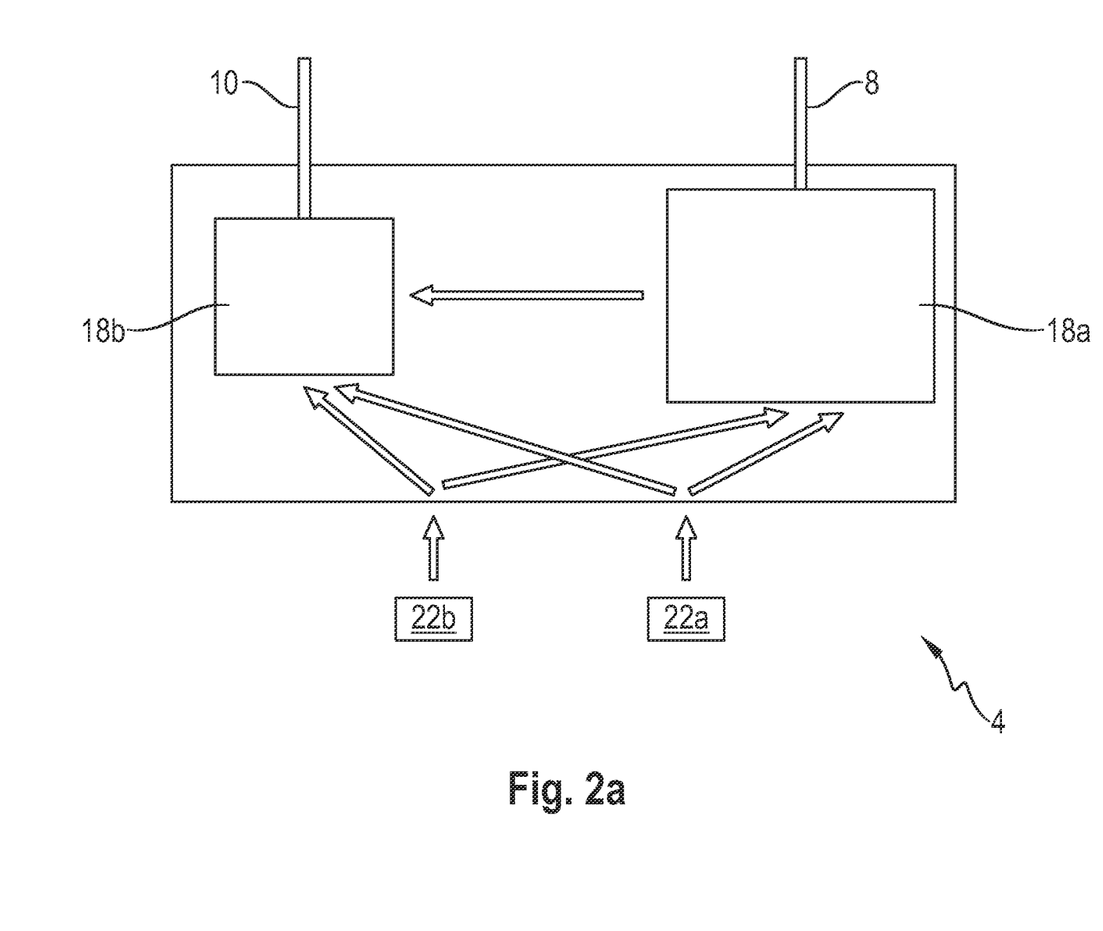

FIG. 2a shows a transmitting unit 4 of an input means 6, 6' of the control system 2 according to aspects of the invention according to a first exemplary embodiment.

The transmitting unit 4 of the input means 6, 6' in this case comprises a first and a second switching unit 18a, 18b, wherein the first switching unit 18a is in the form of a microcontroller in the present case and the second switching unit 18b is in the form of an application-specific integrated circuit.

As can be seen according to FIG. 2a, the first switching unit 18a is integrated in the first transmission channel 8 and the second switching unit 18b is integrated in the second transmission channel 10. The transmitting unit 4 of the input means 6, 6' is manufactured independently of one another in the present case and forwards the input commands in a redundant manner via the first and second transmission channels 8, 10.

As illustrated in the present case, the transmitting unit 4 of the input means 6, 6' receives an input command via sensors 22, wherein a first and a second sensor 22a, 22b are provided for the purpose of receiving an input command, wherein the input command is transmitted both to the first and to the second switching unit 18a, 18b by the first and second sensors 22a, 22b in the present case.

Figure 2B:
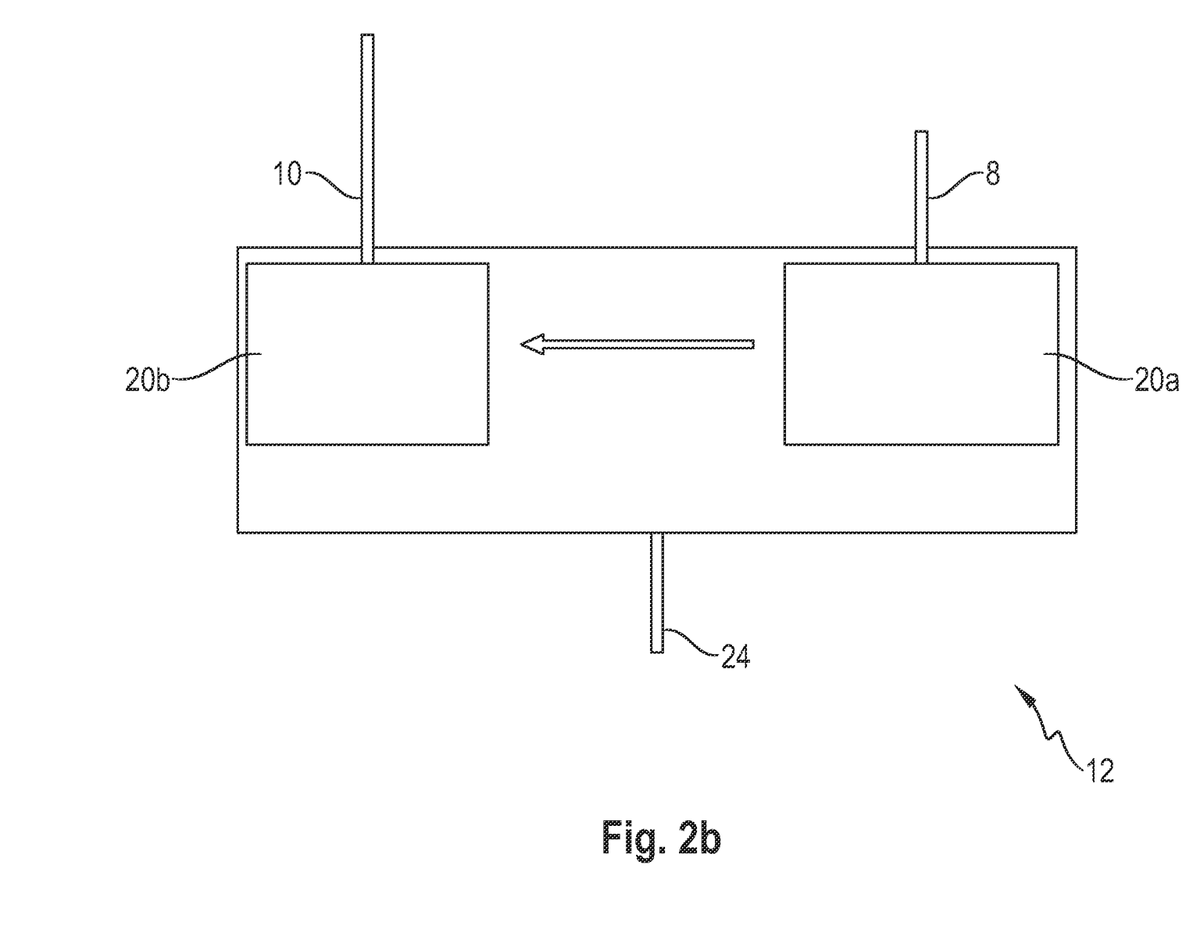

FIG. 2b shows a receiving unit 12 of an execution means 14, 14' of the control system 2 according to aspects of the invention according to a first exemplary embodiment.

As can be seen according to FIG. 2b, the receiving unit 12 of the input means 14, 14' has a first and a second switching unit 20a, 20b, wherein the first switching unit 20a is in the form of a microcontroller in the present case and is integrated in the first transmission channel 8 and the second switching unit 20b is in the form of an application-specific integrated circuit and is integrated in the second transmission channel 10. In the case of the receiving unit 12 in the form of a chip in the present case, the microcontroller and the application-specific integrated circuit are manufactured together. In addition, steering or braking feedback can is be transmitted back to the steering wheel or the brake pedal via the microcontroller. On the basis of the signals received by the receiving unit 12, corresponding signals for executing an input command, such as a steering or brake command, can be sent to the power electronics via the interface 24 and the relevant input command can then be executed.

Figure 3:
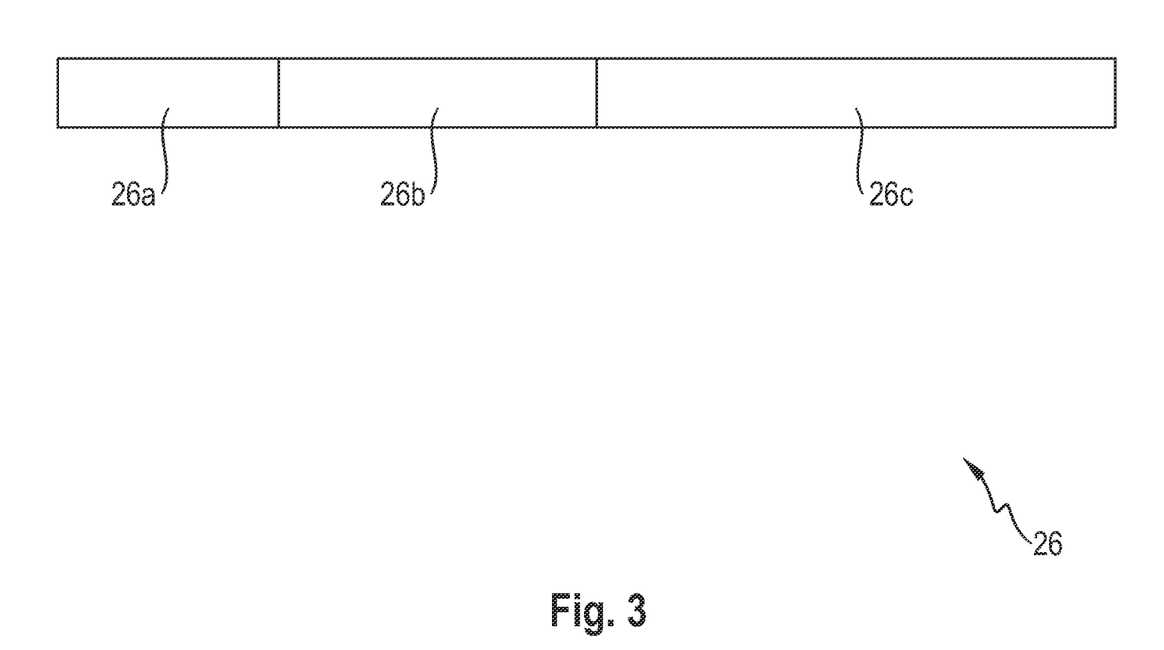

FIG. 3 shows a data packet 26 for transmitting an input command of the control system 2 according to aspects of the invention according to a first exemplary embodiment.

As illustrated in the present case, the signals can be transmitted in an encrypted manner, wherein the second transmission channel 10, in particular, is encrypted by means of a vehicle-specific key.

A first partial data packet 26a may preferably be calculated or derived in this case from input commands or data (for example steering or brake data) and a vehicle-specific key, from which a message authentication code 26b is then created. The message authentication code 26b is then also provided with forward error correction data 26c.

Figure 4A:
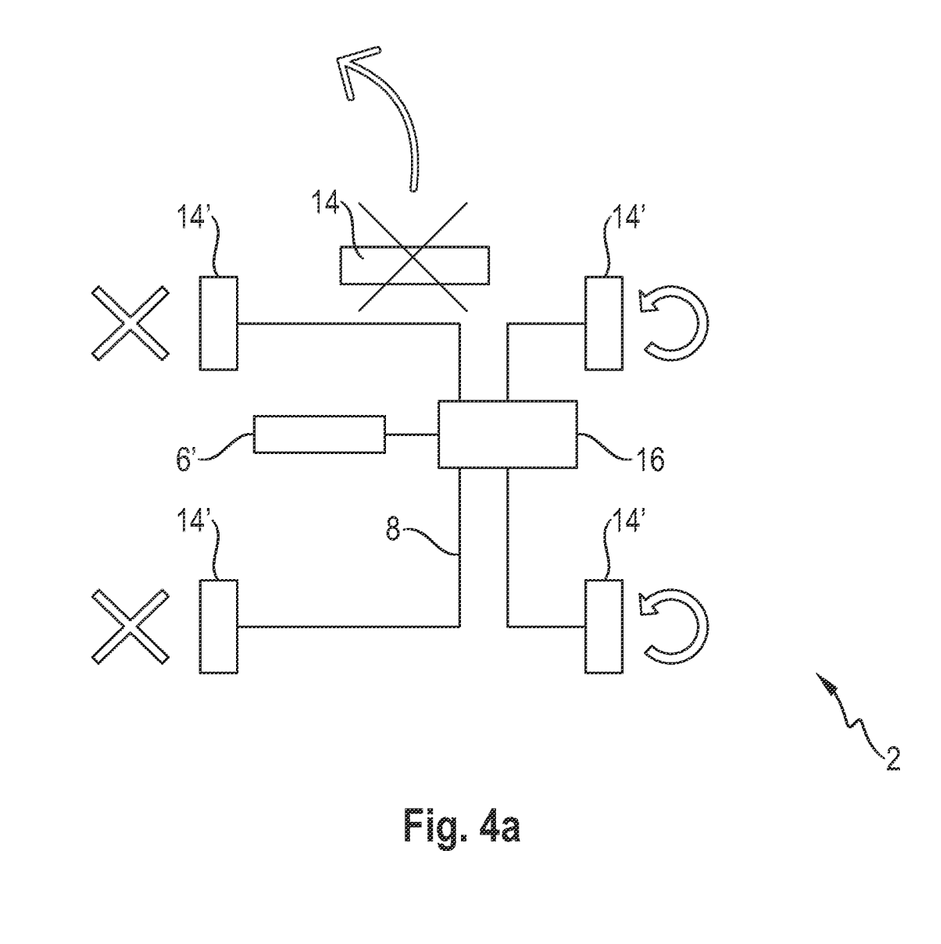
Figure 4B:
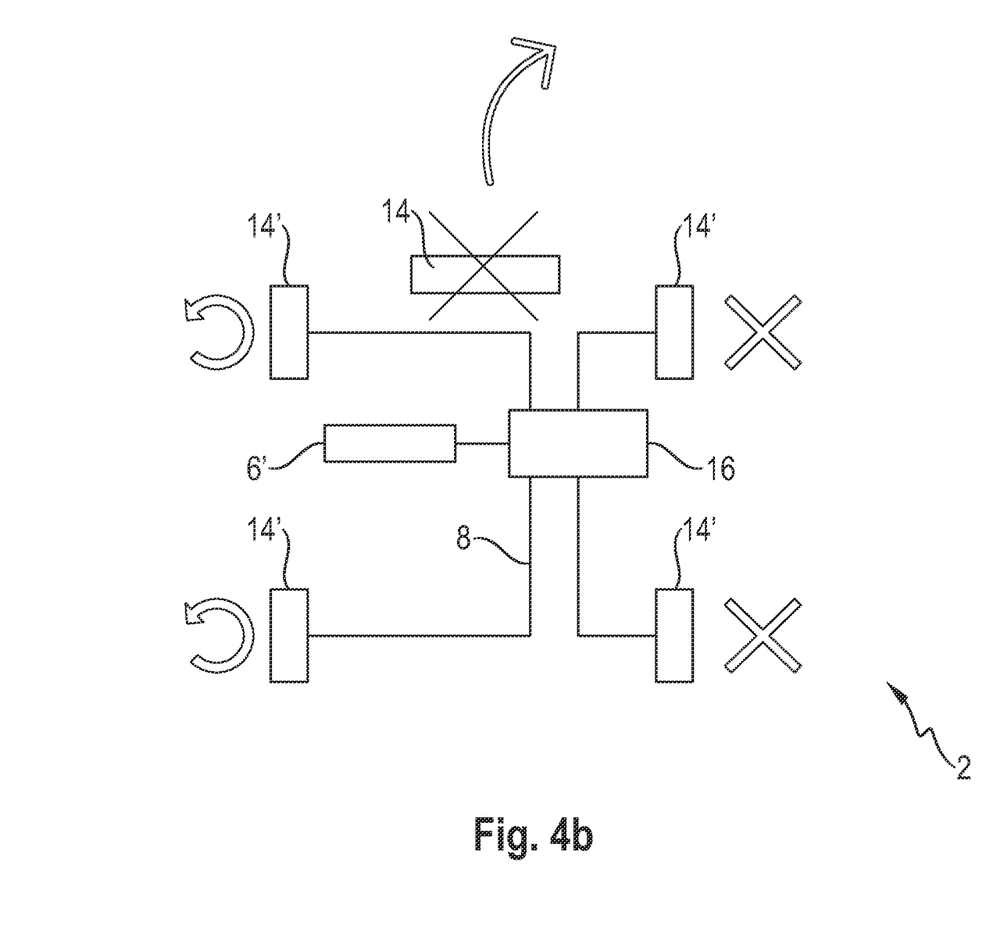

FIGS. 4a and 4b show a method for compensating for the failure of a steering actuator in a control system 2 according to aspects of the invention.

In the method illustrated, provision is made for a steering operation to be carried out by actuating the brakes 14' if the steering actuator 14 fails. In this case, as illustrated in FIG. 4a, a steering operation to the left is initiated by actuating the brakes 14' on the left-hand side, whereas, according to FIG. 4b, a steering operation to the right is initiated by actuating the brakes 14' on the right-hand side.

Figure 5:
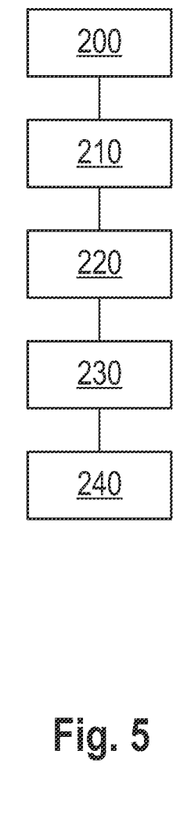

FIG. 5 shows an embodiment of a cable-based control method according to aspects of the invention for controlling a motor vehicle.

In this case, the method according to aspects of the invention comprises the steps of using a transmitting unit 4 of an input means 6, 6' to emit 200 signals for executing an input command, transmitting 210 a first signal via a first transmission channel 8, and transmitting 220 a second signal via a second transmission channel 10. The method according to aspects of the invention also comprises the steps of a receiving unit 12 of an execution means 14, 14' receiving 230 the signals, and using the execution means 14, 14' to execute 240 the input command.

What is claimed is:

1. A wire based control system for controlling a motor vehicle, said wire based control system comprising:
an input means having a transmitting unit for emitting signals for executing input commands,
a first transmission channel connected to the transmitting unit of the input means, the first transmission channel comprising a plurality of discrete bidirectional electrical cables for transmitting a first signal of said signals,
a second transmission channel connected to the transmitting unit of the input means, the second transmission channel comprising a plurality of discrete unidirectional optical cables for transmitting a second signal of said signals,
a plurality of execution means for executing the input commands, wherein each execution means is coupled to a respective electrical cable of the first transmission channel and a respective optical cable of the second transmission channel,
wherein each execution means includes a receiving unit for receiving said first signal and said second signal of said signals from said first and second transmission channels,
wherein said first transmission channel carries the first signal of said signals from the transmitting unit to the receiving units by way of a central control unit,
wherein said second transmission channel carries the second signal of said signals from the transmitting unit directly to the receiving units without the aid of a control unit disposed between the transmitting unit and the receiving units, and
wherein the first and second transmission channels are isolated from each other for redundancy purposes.

2. The control system as claimed in claim 1, wherein the first transmission channel is a bidirectional electrical vehicle network.

3. The control system as claimed in claim 1, wherein the central control unit is integrated in the first transmission channel and arranged between the input means and the execution means.

4. The control system as claimed in claim 3, wherein the central control unit is not integrated in the second transmission channel.

5. The control system as claimed in claim 1, wherein the second transmission channel is in the form of a fiber-optic cable or a polymer optical fiber (POF).

6. The control system as claimed in claim 1, wherein the transmitting unit of the input means has a first switching unit and a second switching unit, wherein the first switching unit is a microcontroller and the second switching unit is an application-specific integrated circuit.

7. The control system as claimed in claim 6, wherein the first switching unit is integrated in the first transmission channel and the second switching unit is integrated in the second transmission channel.

8. The control system as claimed in claim 1, wherein the receiving unit of the input means has a first switching unit and a second switching unit, wherein the first switching unit is a microcontroller and the second switching unit is an application-specific integrated circuit.

9. A motor vehicle comprising the wire based control system of claim 1.

10. The control system as claimed in claim 1, wherein the transmitting unit of the input means has a first switching unit and a second switching unit, wherein the receiving unit of the input means has a first switching unit and a second switching unit, wherein the first transmission channel interconnects the first switching units of the transmitting and receiving units, and wherein the second transmission channel interconnects the second switching units of the transmitting and receiving units.

11. The control system as claimed in claim 10, wherein each of the first switching units is a microcontroller and each of the second switching units is an application-specific integrated circuit.

12. The control system as claimed in claim 10, wherein the transmitting unit of the input means is connected to a first sensor and a second sensor such that the transmitting unit initially receives the input commands via the first sensor and the second sensor, and wherein the input command is then transmitted both to the first switching unit and to the second switching unit of the transmitting unit by each of the first and second sensors.

13. A wire based control method for controlling a motor vehicle, said method comprising:
- emitting signals for executing an input command using a transmitting unit of an input means of the motor vehicle,
- transmitting a first signal of said signals via a first transmission channel of the motor vehicle that is connected to the transmitting unit of the input means, the first transmission channel comprising a plurality of discrete bidirectional electrical cables,
- transmitting a second signal of said signals via a second transmission channel of the motor vehicle that is connected to the transmitting unit of the input means, the second transmission channel comprising a plurality of discrete unidirectional optical cables,
- receiving the first signal and the second signal of said signals at respective receiving units of a plurality of execution means of the motor vehicle for executing the input command, wherein each execution means is coupled to a respective electrical cable of the first transmission channel and a respective optical cable of the second transmission channel, and
- executing the input command using the plurality of execution means,
- wherein said first transmission channel carries the first signal of said signals from the transmitting unit to the receiving units by way of a central control unit,
- wherein said second transmission channel carries the second signal of said signals from the transmitting unit directly to the receiving units without the aid of a control unit disposed between the transmitting unit and the receiving unit, and wherein the first and second transmission channels are isolated from each other for redundancy purposes.

14. The control method as claimed in claim 13, wherein the transmitting unit has a first switching unit and a second switching unit, wherein the transmitting unit of the input means initially receives the input command via a first sensor and a second sensor, and wherein the input command is then transmitted both to the first switching unit and to the second switching unit by each of the first and second sensors.

15. The control method as claimed in claim 13, wherein the signals are transmitted in an encrypted manner, wherein the second transmission channel is encrypted by a vehicle-specific key, wherein a message authentication code which is composed of the input commands and the vehicle-specific key is created during encryption.

16. The control method as claimed in claim 13, wherein a function of the execution means is substituted using at least one other execution means in an event of a defect.

17. The control method as claimed in claim 16, wherein a steering operation with a defective steering means is carried out by activating at least one brake means.

18. The control method as claimed in claim 13, wherein the central control unit is integrated in the first transmission channel and arranged between the input means and the execution means for transferring the first signal, and wherein the central control unit is not integrated in the second transmission channel.

19. The control method as claimed in claim 13, wherein the transmitting unit of the input means has a first switching unit and a second switching unit, wherein the receiving unit of the input means has a first switching unit and a second switching unit, wherein the first transmission channel interconnects the first switching units of the transmitting and receiving units, and wherein the second transmission channel interconnects the second switching units of the transmitting and receiving units.

20. The control method as claimed in claim 19, wherein each of the first switching units is a microcontroller and each of the second switching units is an application-specific integrated circuit.

* * * * *